E. A. JONES.
GARDEN IMPLEMENT.
APPLICATION FILED MAR. 15, 1917.
1,279,704.
Patented Sept. 24, 1918.
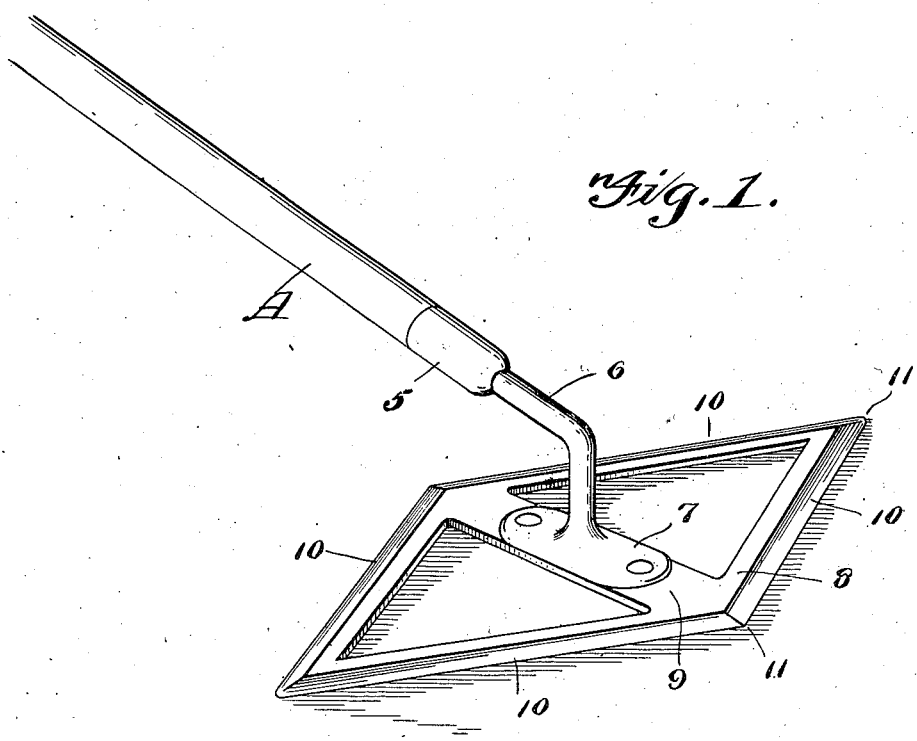
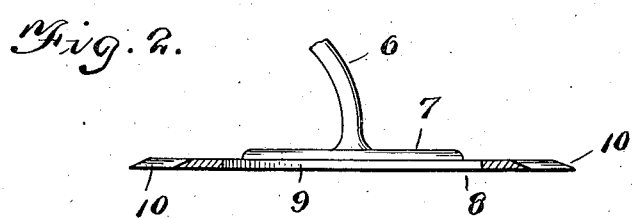
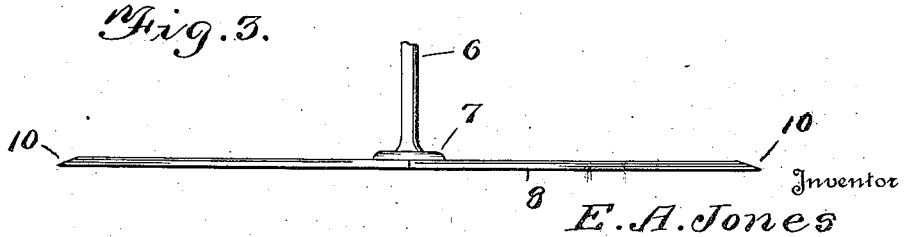
Inventor
E. A. Jones
Witness
E. Q. Ruppert
By Valbert & Parker
Attorneys

UNITED STATES PATENT OFFICE.

EBER ATKINS JONES, OF ROSEDALE, KANSAS.

GARDEN IMPLEMENT.

1,279,704.  Specification of Letters Patent.  Patented Sept. 24, 1918.

Application filed March 15, 1917. Serial No. 155,011.

*To all whom it may concern:*

Be it known that I, EBER ATKINS JONES, a citizen of the United States, residing at Rosedale, in the county of Wyandotte and State of Kansas, have invented certain useful Improvements in Garden Implements, of which the following is a specification, reference being had therein to the accompanying drawing.

The invention relates to a garden implement, and more particularly to the class of weeders.

The primary object of the invention is the provision of an implement of this character wherein the same is constructed to permit the use thereof as a hoe, weed cutter, soil aerator and hand surface cultivator.

Another object of the invention is the provision of an implement of this character wherein the blade thereof is in the form of a frame, presenting four distinctive cutting edges and four tips, so as to enable a backward and forward movement in the manipulation of the implement for the cultivating of the soil, the cutting of weeds or the use thereof as a hoe, and also in aerating the soil, the cutting edges being diagonally disposed to serve for shearing action, thereby enabling the work to be accomplished more easily and with rapidity.

A further object of the invention is the provision of an implement of this character which is extremely simple in construction, strong, durable and efficient in operation, and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a perspective view of an implement constructed in accordance with the invention;

Fig. 2 is a fragmentary enlarged sectional view therethrough;

Fig. 3 is an elevation.

Similar reference characters indicate corresponding parts throughout the several views of the drawing.

Referring to the drawing, A designates generally a handle, which may be of any required length and at its connected end has fitted thereon a ferrule 5, from which projects the shank 6 which is of curvilinear formation and is fitted within an eye 7 carried by the blade of the implement. The blade of the implement comprises a body 8 preferably of open frame formation and simulating a diamond shaped contour. The body is formed medially thereof with a cross web 9 on which is carried the eye 7 and the diagonal outer marginal edges of said blade are beveled to form cutting edges 10, while the corners 11 constitute tips so that the blade, when in use, will serve for horizontal weeding and will enable the use thereof as a hoe, weed cutter or hand surface cultivator. Another important object of the double blade form of the implement is that one blade becomes a depth regulator for the other. In the forward motion, by elevating the handle of the implement slightly, it gives the front blade more suction and the operator is enabled to cut as deep as desired, but if cutting too deep, depress the handle slightly and the rear blade becomes a fulcrum to force the front blade to a shallow depth or out of the ground, and this action is vice versa in the backward motion to give the rear blade more suction.

It will be observed that the triangular opening on either side of the cross web have their side edges paralleling the cutting edges of the implement, the sides of the triangular openings where they connect with each other forming pointed crotches by means of which the stalks of weeds may be engaged by the implement and extracted from the ground, roots and all. It is obvious that the formation of these acute crotches by the meeting sides of the openings form means for obtaining an effective grip on the stalks of weeds, thereby enabling the implement to be used to extract weeds from the ground by the roots, after the cutting edges have been used for the removal of the branches and leaves.

From the foregoing description, taken in connection with the accompanying drawing, the construction and manner of use of the herein described garden implement will be readily apparent and, therefore, a more extended explanation has been omitted.

Having thus described my invention, I claim:

A garden implement consisting of a diamond shaped body providing four cutting edges, the body having two triangular openings formed therein and being provided with a cross web separating the two openings, certain sides of the said triangular openings paralleling the cutting edges of the body and meeting sides of said openings forming acute crotches by means of which the stalks of weeds may be engaged to extract the weeds from the ground, and means carried by the cross web for attachment to a handle.

In testimony whereof I affix my signature.

EBER ATKINS JONES.